United States Patent [19]

Unkauf

[11] 4,032,847
[45] June 28, 1977

[54] DISTORTION ADAPTER RECEIVER HAVING INTERSYMBOL INTERFERENCE CORRECTION

[75] Inventor: Manfred G. Unkauf, Franklin, Mass.

[73] Assignee: Raytheon Company, Lexington, Mass.

[22] Filed: Jan. 5, 1976

[21] Appl. No.: 647,261

[52] U.S. Cl. .............................. 325/323; 325/473; 328/162
[51] Int. Cl.² ......................................... H03K 9/00
[58] Field of Search ............... 178/88, 67; 325/320, 325/321, 322, 323, 324, 473, 474, 475, 476; 328/162, 164, 165

[56] References Cited

UNITED STATES PATENTS

| | | | |
|---|---|---|---|
| 3,605,018 | 9/1971 | Coviello | 325/473 |
| 3,875,333 | 4/1975 | Nakano et al. | 325/323 |

*Primary Examiner*—Benedict V. Safourek
*Attorney, Agent, or Firm*—J. R. Inge; M. D. Bartlett; J. D. Pannone

[57] ABSTRACT

A differentially adaptive receiver system in which correction is provided for degradation of performance caused by overlapping of adjacent data pulses. A reference signal is produced having the same complex envelope as the received signals and having a constant phase state independent of changes of phase state of the received signals. The received signals are detected against the reference signal as in an ideal matched filter receiver. The detected signals are integrated by an integrate and dump filter over the duration of the pulse period. A correction signal representing the amount of overlap between overlapping adjacent pulses is summed with the output of the integrated dump filter. The sum of the correction signal and integrate and dump filter output is sampled and held by sample and hold circuit to produce the digital data output.

21 Claims, 4 Drawing Figures

DISTORTION ADAPTER RECEIVER HAVING INTERSYMBOL INTERFERENCE CORRECTION

The invention herein discribed was made in the course of or under a contract or subcontract thereunder with the Department of Defense.

CROSS-REFERENCE TO RELATED APPLICATION

U.S. Pat. No. 3,794,921 issued Feb. 26, 1974 to the present inventor Manfred G. Unkauf and assigned to the present assignee is herein incorporated by reference.

BACKGROUND OF THE INVENTION

1. Field of the Invention

The invention relates to receivers used for signals having multipath corrupted phase properties and with distortion caused by overlapping of adjacent data pulses.

2. Description of the Prior Art

A differentially adaptive communications system was described in U.S. Pat. No. 3,794,921 issued Feb. 26, 1974 to Manfred G. Unkauf and assigned to the present assignee, the disclosure of that patent being herein incorporated by reference.

With the referenced patent is described a communications system for improved reception of signals which were transmitted through communications channels having multipath distortion characteristics. Within that system, a reference signal is produced in the receiver which has the same complex envelope as that of the received signals over a number of received pulses. The reference is used in a coherent matched filter-type detector employing decision feedback to permit coherent detection of the signals without the use of channelizing filters for systems employing multiple phase state digital signal modulation. Although the referenced system was capable of operating with signals from a plurality of channels, it was required that there be no appreciable overlap between adjacent pulses within any one channel in order to produce a valid determination of the phase state of pulses within any channel. Intersymbol interference caused by overlapping of adjacent pulses in the previously disclosed system and in other such communications systems reduced the signal levels within the receiver for some pulses and increased the level for others. For pulses in which the signal amplitude was lowered, the amplitude was often insufficient to permit a valid determination of the phase state of that pulse. Consequently, the system had to be operated with sufficient time spacing between adjacent bits that no overlapping could occur for any possible channel conditions. Hence, the data rate for any one channel was appreciably lowered due to the non-overlapping requirement.

SUMMARY OF THE INVENTION

Accordingly, it was an object of the present invention to provide a communications receiver system for digital data in which the effects of intersymbol interference are substantially decreased.

It is also an object of the present invention to provide a differentially adaptive communications system which may be operated at a higher data rate than previous systems in the presence of intersymbol interference.

Moreover, it is an object of the present invention to provide a differentially adaptive communications system having a correction signal producing circuit for correcting received signals for intersymbol interference.

These, as well as other objects of the invention, are met by providing a differentially adaptive receiver which is self-adaptive to multipath distortion having means for compensating for intersymbol interference. Within the present description of the invention and accompanying claims, the terms "differentially adaptive receiver" and "receiver which is self-adaptive to multipath distortion" and similar terms are defined as a receiver described and claimed within referenced U.S. Pat. No. 3,794,921. The interference compensating means may comprise means for determining the presence of the intersymbol interference and means for correcting information bearing signals within the receiver in response to the intersymbol interference determining means. The means for determining the presence of intersymbol interference may produce a signal in response to the overlap between adjacent symbols. The means for determining the presence of intersymbol interference may also comprise means for comparing the value of a present bit decision with the value of the integral of the received signal. The correcting means may further operate in response to the comparing means to provide a signal for correcting the magnitude of the integrated signal to correspond to the correct bit decision state.

The invention may also be practiced by providing a receiver having means for producing a signal representing the integral of detected received signals wherein the received signals comprise a series or train of pulses each of the pulses being encoded with one of a predetermined number of phase states, means for producing an output signal which is a dc voltage representative of the discrete states of the pulses and having a separate voltage level corresponding to each of the possible states, means for producing an error signal corresponding to the difference between the output signal and the integrated received signal, and means for producing a correcting signal in response to the error signal wherein the correcting signal and integrated signal are summed prior to being sampled to produce the output signal. The output signal producing means preferably comprises means for producing one or more samples of the signal representing the integral and means for maintaining or holding the value of the integral of the samples constant over a predetermined time period determined by external synchronization means. The correcting signal producing means in preferred embodiments includes means for multiplying the error signal by the output or sampled signal, means for averaging the product produced by the multiplying means, and multiplying means for multiplying the averaged signal produced by the multiplying means by the output signal. The correcting signal is produced so as to have a magnitude which is proportional to the amount of overlap of adjacent ones of the pulses.

The invention also encompasses a combination of means for receiving multipath distorted phase shift keyed signals, and means for producing a reference signal which has substantially the same modulation envelope as the received signals over a short time period and also having a phase state independent of the changes of phase state in the received signals which is preferably equal to a zero phase shift state or a predetermined one of the phase states but invariant as the phase state changes among pulses, means for detecting the phase state of the received signals by comparing the phase state of the received signals with the phase state of the reference signal, means for integrating the detected signal which also includes means for resetting the integrating means to a zero value at the conclusion of a bit time period, means for summing the integrated detected signal with a correction signal so as to produce a corrected detected signal, means for sampling the sum produced by the summing means and for producing an output signal in response to the sampled signal which represents the phase state of the received signals by a dc voltage having a value which corresponds to each of the possible phase states, means for producing a signal representing the difference between the sum produced by the summing means and the output signal, means such as a shift register for storing a signal representing the phase state of the immediately previously produced pulse which may be a binary digit, first multiplying means for multiplying the signal representing the difference by the signal stored in the storing means, means for producing a signal representing the average signal over a pulse time period of the difference or error signal over at least a portion of a pulse period, and second multiplying means for multiplying the signal representing the average by the same stored signal within the storage means in which the correcting signal is produced as the product generated or produced by the second multiplying means. The correcting signal is produced as the output of the second multiplying means having a magnitude and polarity such as to correct the output of the integrator for error caused by overlap between adjacent pulses. The magnitude and polarity of the correcting signal are in proportion to the amount or total time period multiplied by magnitude of adjacent ones of the pulses. The sampling means preferably samples the sum produced by the summing means a plurality of times during a pulse processing or time period at predetermined intervals until the correction signal is substantially zero at which time the present bit decision is substantially uncorrelated with the previous bit and at which time the error is reduced to the minimum level in the least mean square sense. The phase state of the received signal may be a binary phase shift key having four predetermined values, quarternary phase shift keying having four predetermined values, or of any other type of phase shift keying modulation.

DESCRIPTION OF THE PREFERRED EMBODIMENTS

Figure 1:
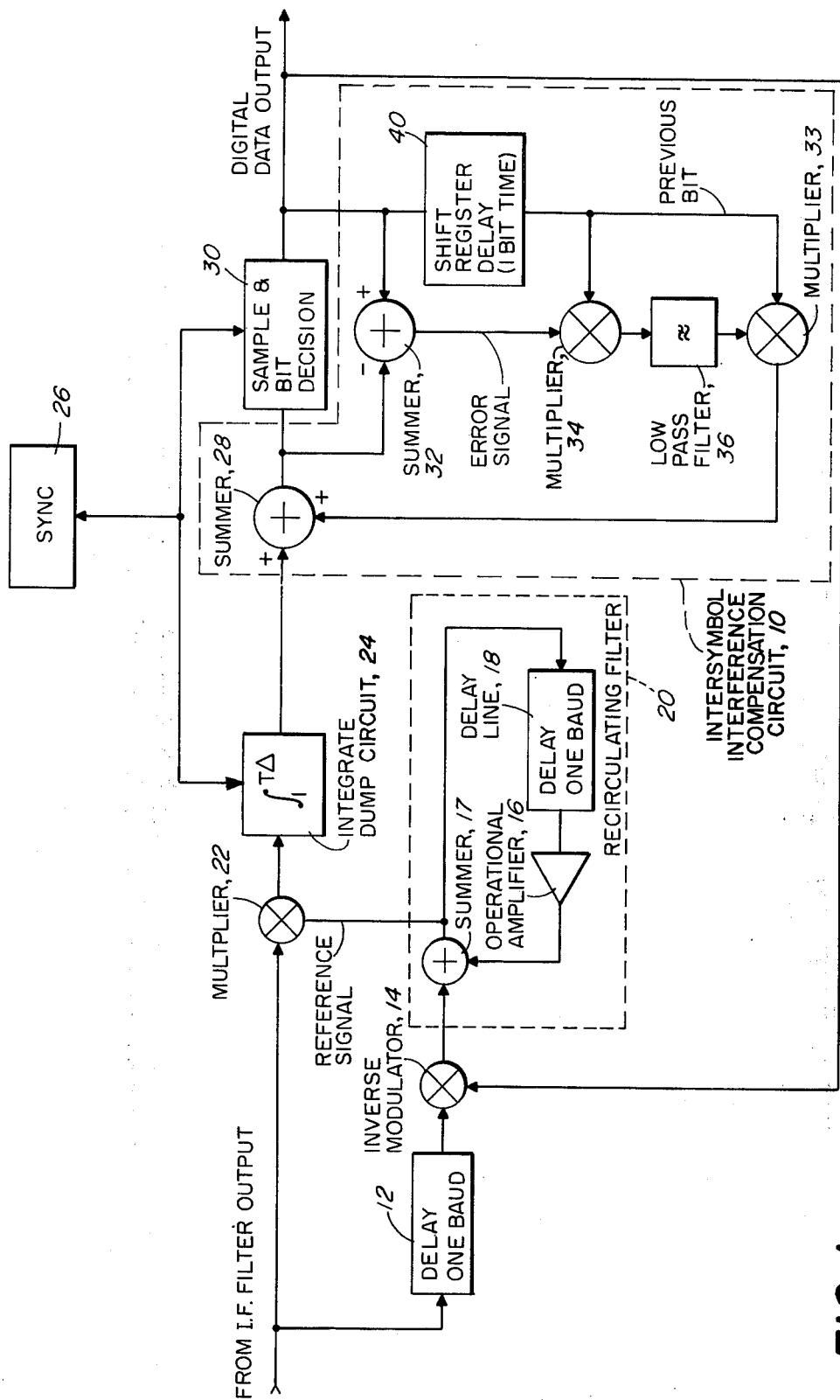
FIG. 1 is a schematic block diagram showing a decision adaptive communication receiver system incorporating the present invention.

In FIG. 1 is shown a schematic block diagram of an embodiment of the invention in a binary phase shift keying receiver system. The system shown in FIG. 1 employs the same basic receiver circuit as the embodiment of the invention shown in FIG. 2 of the referenced patent where like named elements perform a similar function. The input signal from the IF filter is coupled both to multiplier 22 and to delay circuit 12 which produces a delay of one baud or bit period time. The signal from the IF filter output is compared with a reference signal by multiplication or detection by multiplier 22.

The reference signal is produced in the manner described in the reference patent. The incoming IF signal is delayed by delay circuit 12 and multiplied by the digital output of the previous bit which may be represented as +1 or −1. As the signal output from delay circuit 12 arrives at inverse modulator 14 at the same time as the corresponding digital output representing the +1 or −1 state, the output of inverse modulator 14 is a signal having the same complex envelope as the incoming signals but with a constant phase state.

The output of inverse modulator 14 is added with the signal circulating in the loop comprising summer 17, delay line 18, and operational amplifier 16. The signal circulating within that loop is made up as a sum of a number of previous inputs from inverse modulator 14 all having substantially the same complex envelope and phase state. Since noise within a single pulse input from inverse modulator 14 is essentially a random phenomenon, the composite reference signal formed from a summation of a number of pulses produced from inverse modulator 14 has a greatly reduced signal-to-noise ratio than a single input pulse as the noise components of the summation of many such pulses tend to cancel while the signal content is additive. The gain of operational amplifier 16 is set less than unity such that the amplitude of the reference signal emerging from recirculating filter 20 is maintained at a constant level.

The detected signal produced by multiplier 22 is a positive going signal of alternating amplitude for an input pulse having a first phase state and a negative going signal input pulse having a second phase state. The output from multiplier 22 is coupled to the input of integrate and dump circuit 24. Starting at the beginning of the pulse period as marked by a timing pulse from synch circuit 26, integrate and dump circuit 24 produces an output signal which is essentially the integral of the signal on its input. In previous systems the output of integrate and dump circuit 24 was sampled directly at a time near the end of the pulse period and a decision was made as to whether the sampled voltage was positive or negative and greater in magnitude than a predetermined threshold voltage. If the signal voltage from the output of integrate and dump circuit 24 was positive and above a preset threshhold voltage, a digital signal was produced by the sampling circuit which represented a +1 state. If the output voltage on the output of integrate and dump circuit 24 was negative and less the preset threshhold voltage, the sampling circuit produced an output signal representing the digital state of −1.

Figure 2:
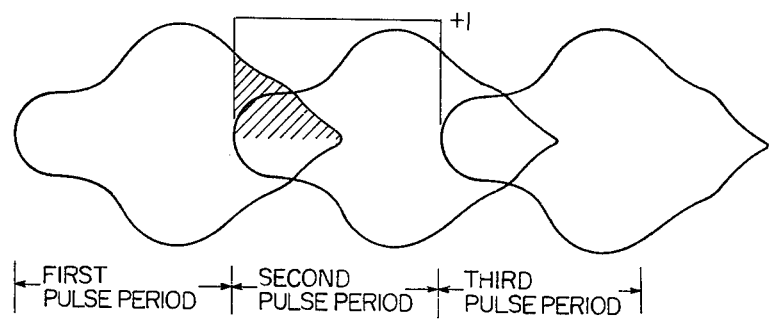
FIGS. 2 and 3 are waveforms of signals within the system useful in attaining an understanding of the invention.
Figure 3:
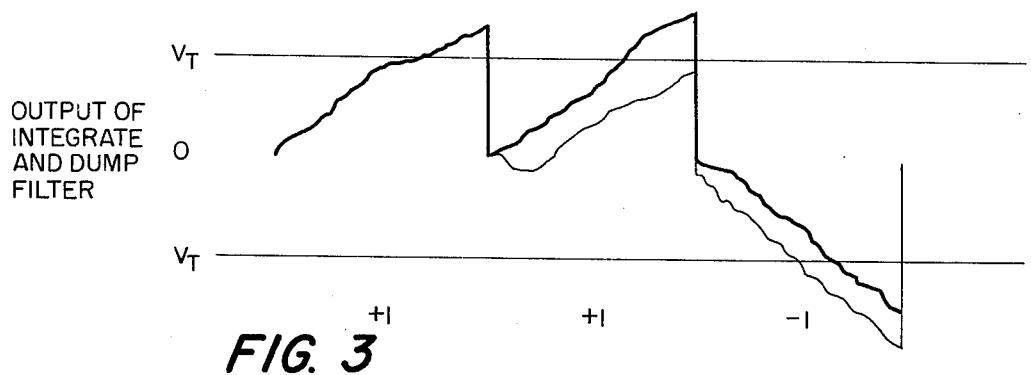

A typical output waveform from integrate and dump circuit 24 is shown in FIG. 3 for the three pulses shown in FIG. 2. All three pulses have essentially the same complex envelope although the phase state of the carrier signal within each pulse may vary. For the first pulse shown in FIG. 2, there is essentially no intersymbol interference although a tail of the pulse caused by multipath distortion may stretch beyond the predetermined pulse period. The value of the output voltage from integrate and dump circuit 24 increases monotonically from the beginning of the pulse period and exceeds the threshhold level of $+V_T$ before the end of the pulse period. Sample and bit decision circuit 30 makes the determination that the pulse represents a state corresponding to a digital output of +1.

For the second pulse period shown in FIG. 2, the tail end of the first pulse overlaps the initial portion of the second pulse. Because of the combination of phase states of the overlapping pulses and the point at which the overlapping begins the overlapping portion of the first pulse causes the output of integrate and dump circuit 24 to first swing negative although a digital state of +1 is intended by the actual phase state of the second pulse. This is shown by the lighter of the two lines shown for the output of integrate and dump circuit 24 during the second pulse period as it would appear in the absence of intersymbol interference cancellation. Although the overlapping of the first pulse into the second pulse disappears before the second pulse output from integrate and dump circuit 24 is sampled, the integrated output voltage never reaches the threshhold voltage $+V_T$ thereby producing an error as no decision can be reached. During the third pulse period, the pulse has a phase characteristic representing a digital −1 such that the contribution caused by the overlapping portion of the second pulse causes the output voltage at the output of integrate and dump circuit 24 to fall at a greater rate than is otherwise required. No error is thereby produced although some circuits may be saturated due to the increased voltage magnitude.

To compensate for the presence of intersymbol interference, intersymbol intereference compensation circuit 10 is added between the output of integrate and dump filter 24 and the input of sample and bit decision circuit 30 to compensate for the undesirable variations in the output of integrate and dump circuit 24. In the embodiment of the invention shown in FIG. 1, sample and bit decision circuit 30 continuously samples the output signal produced by summer 28 during the latter portions of each pulse period. An error signal is formed at the output of summer 32 corresponding to the difference between the digital +1 or −1 output from sample and bit decision circuit 30 and the input to that circuit which is the sum of the output of integrate and dump circuit 24 and a correction signal. All of the analog signals within the system are approximately normalized between levels of voltage corresponding to the digital signal representing digital state of +1 and −1 from an automatic gain control circuit which operates upon signals within the system prior to the IF filter. In the absence of intersymbol interference, the error signal on the output of summer 32 has an average value of zero because the output voltage from integrate and dump circuit 24 is at approximately the same voltage level as the digital signal representing the +1 or −1 bit decision. In the presence of intersymbol interference, the error signal will begin to assume a non-zero level.

The bit decision from the previous pulse is stored within digital storage means for shift register delay 40. Shift register delay 40 may comprise one or more flip-flops. A correlation between the error signal and the previous bit decision is performed by multiplying the error signal by the previous bit at the output of shift register delay 40. The resultant product or correlation function is filtered or, equivalently, averaged by low pass filter 36 to obtain at the output thereof an estimate of the error in the output of integrate and dump circuit 24 caused by intersymbol interference.

The output of low pass filter 36 is multiplied by the output of shift register delay 40 thereby producing the correction signal which is coupled back to summer 28.

The final multiplication is necessary so that the output of low pass filter 36 is multiplied by either +1 or −1 to give the proper polarity of correction voltage. The output of summer 28 continues to be sampled and further error and correction signals produced until the error signal becomes substantially uncorrelated with the previous bit decision. At that time, a final decision is made as to the proper value of the digital output signal from sample and bit decision 30. A pulse from synch circuit 26 then causes integrate and dump circuit 24 to dump or reset to zero at the end of the pulse period so that the system may then process the next incoming received pulse.

The action of intersymbol interference compensation circuit 10 is shown diagrammatically in FIGS. 2 and 3. Without the presence of intersymbol interference compensation circuit 10 the output of integrate and dump circuit 24 would appear as shown by the thinner lines during the second and third pulse periods. The correction signal which is formed within intersymbol intereference compensation circuit 10 is approximately represented by the area at the end of the first pulse period which is shown as the shaded section in FIG. 2. The greater the overlap between the two pulses the larger will be the shaded section. When the correction signal is added to the output of integrate and dump circuit 24, the summed output as it appears on the output of summer 28 follows the voltage as illustrated by the heavier of the lines shown during the second and third pulse periods. The presence and application of the correction signal causes the sampled output from summer circuit 28 to exceed in magnitude $+V_T$ during the second pulse period so that an error on the output of the circuit is avoided. During the third pulse period, the correction signal also acts to bring the output of summer circuit 28 within expected limits although no error would have been produced. However, an advantage is attained in that the amplitude of the signals emerging from summer circuit 28 are restrained to be within expected limits so that saturation conditions on the input of sample and bit decision circuit 30 and the output of summer circuit 28 are thereby avoided.

Figure 4:
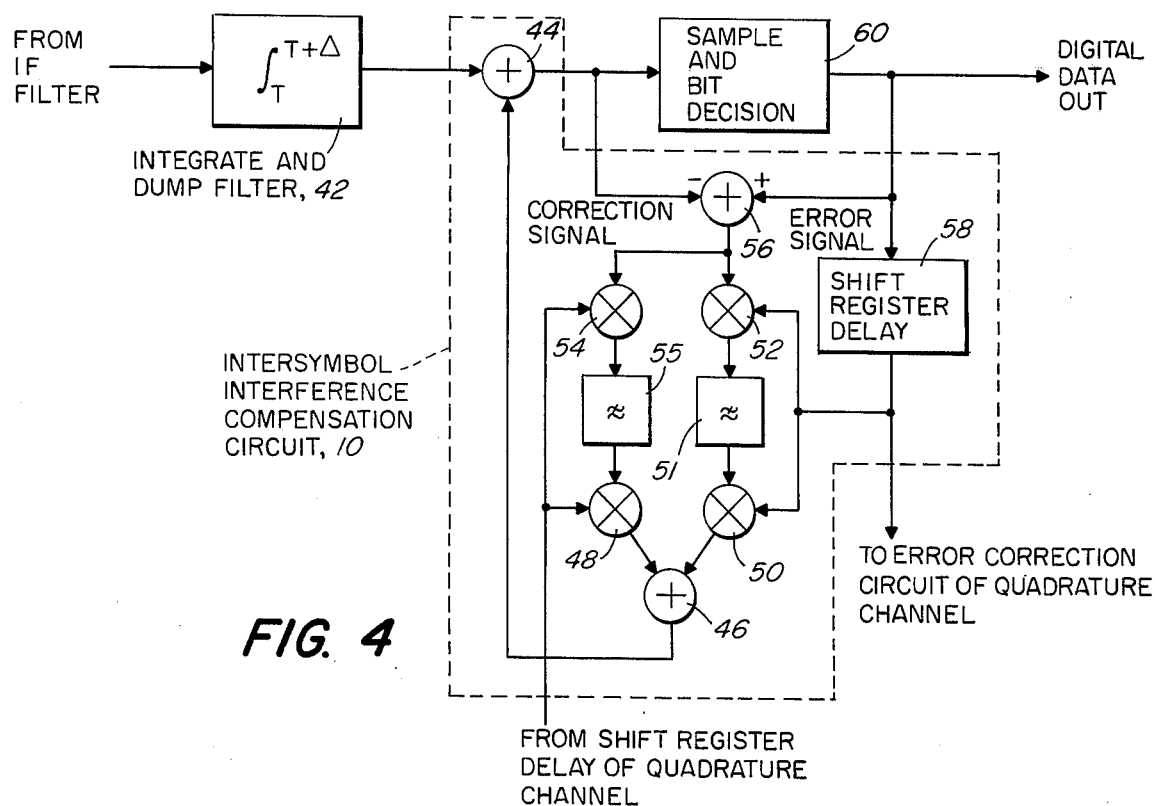
FIG. 4 is a block schematic diagram of a portion of a decision adaptive receiver system employing quarternary phase shift keying in which the present invention is used to advantage.

An application of the invention within a quarternary phase shifted keyed system is shown by the schematic block diagram shown in the view of FIG. 4. A block diagram of a larger portion of the receiver without the use of an intersymbol intereference compensation circuit is shown in FIG. 4 of the referenced patent. It is to be understood that for purposes of clarity of illustration the system shown herein in FIG. 4 represents only a portion of the receiver system shown in FIG. 4 of the referenced patent and that in the operative system the remaining portions of the system shown in FIG. 4 of the referenced patent should be provided in each of the two quadrature channels. As in the previously described embodiment of the invention, an intersymbol interference compensation circuit 41 is coupled between the output of integrate and dump circuit 42 and the input of sample and bit decision circuit 60. An error signal is formed as before on the output of summer 56 representing the difference between the output signal on the ouptut of sample and bit decision circuit 50 representing a digital +1 or −1 and the ouptut from summer 44, the input addends of which are the output from integrate and dump circuit 42 and the correction signal. Shift register delay 58 functions as in the previously described embodiment storing the value of the digital output from the previously processed data bit.

The error signal is correlated with the previous bit by multiplier 52, averaged by low pass filter 51, and corrected to the right polarity by multiplying the averaged output from the low pass filter 51 by the previous bit decision on the output of shift register delay 58. The output from multiplier 50 is thus formed identically with the correction signal of the previously described embodiment. However, because of the quadrature channel, a correction or compensation must be made for intersymbol interference caused by data bits or pulses in the quadrature channel. An identical intersymbol interference compensation circuit is coupled between the integrator and sample circuits of the quadrature channel. The output of the shift register delay of the quadrature channel is coupled to one input of each of multipliers 54 and 48. The error signal from summer 56 is coupled to the second input of multiplier 54 and low pass filter 55 identical to low pass filter 51 is coupled between the output of multiplier 54 and the second input of multiplier 48. In this manner a second component of the correction signal is produced at the output of multiplier 48 identical with the production of the component of the correction signal produced on the output of multiplier 50 but in which the output from the shift register delay of the quadrature channel is used as the signal to which the error signal is correlated. The two components of the correction signal are summed by summer 46 to thereby produce the correction signal coupled to summer 44. In general, for systems having more than two possible phase states or having channels in quadrature or predetermined phase relationship to one another, it is required that there be a component of the correction signal in any one channel produced in response to intersymbol interference caused by pulses within the other channels.

The invention can also be used to cancel interference from more than one previous pulse by correlating the error signal with the stored digital bit decisions from as many previous pulses for which it is desired to cancel the intersymbol interference. For example, if it were desired to cancel interference from two immediately previous pulses, a second shift register delay would be provided which stores the digital bit decision from the second previous pulse. This may be formed by delaying the output of the already provided shift register delay circuit by one more bit time with the addition of a second shift register delay circuit. The error signal is then multiplied by the output from the second shift register, the output of the first multiplier filtered by a low pass filter, and the averaged output from the low pass filter corrected in polarity by multiplying by the same bit decision output. The output from the second multiplier coupled to the shift register delay circuit storing the bit decision from two bits previous is summed with the output of the second multiplier coupled to the shift register delay circuit storing the immediately previous bit decision to form the error correction signal. This structure may be continued for cancellation of intersymbol interference from as many previous pulses as is desired and deemed expeditious depending upon the exact properties of the communications channels in which the system is used.

This completes the description of the preferred embodiments of the invention. Although preferred embodiments of the invention have been described, numerous modifications and alterations thereto would be apparent to one having ordinary skill in the art without departing from the spirit and scope of the invention.

What is claimed is:

1. A differentially adaptive receiver comprising:
   means for receiving multipath distorted phase shift keyed pulse signals;
   means for deriving a reference signal having substantially the same envelope as pulses of received signals and a phase state independent of changes of phase state in said received signals;
   means for detecting the phase state of said received signal pulses, said detecting means comprising means for comparing the phase state of said received signals with the phase state of said reference signal; and
   means for compensating said received signals for intersymbol interference.

2. The receiver of claim 1 wherein said intersymbol interference compensating means comprising in combination:
   means for determining the presence of intersymbol interference; and
   means for correcting information bearing signals within said receiver in response to said intersymbol interference determining means.

3. The receiver of claim 2 wherein said means for determining the presence of intersymbol interference produces a signal in response to overlap between adjacent symbols.

4. The receiver of claim 2 further comprising:
   means for producing a signal representing the integral of said information bearing signals; and
   means for producing a signal representing a present bit decision from said signal representing the integral; and
   wherein said means for determining the presence of intersymbol interference comprises:
   means for comparing the value of said present bit decision with the value of said signal representing the integral.

5. The receiver of claim 4 wherein said correcting means comprises:
   means for producing a signal for correcting said signal representing the integral in response to the output of said comparing means; and
   means for summing said signal representing the integral and said correcting signal.

6. A receiver comprising in combination:
   means for producing a signal representing the integral of detected received signals, said received signals comprising a series of pulses, each of said pulses representing a discrete digital state;
   means for producing an output signal representing the discrete digital states of said received signals;
   means for producing an error signal representing the difference between said output signal and said signal representing said integral;
   means for producing a correcting signal in response to said error signal; and
   means for summing said signal representing the interal and said correcting signal.

7. The combination of claim 6 wherein the sum of said correcting signal and said signal representing said integral form the input to said output signal producing means.

8. The combination of claim 7 wherein said output signal producing means comprising in combination:
   means for producing one or more samples of said signal representing said integral; and means for storing the value of said samples over a predetermined period of time.

9. The combination of claim 6 wherein said correcting signal producing means comprises:
means for storing the output signals from the previous pulses;
means for multiplying said error signal by the stored output signal;
means for averaging the product produced by said multiplying means; and
means for multiplying the averaged signal produced by said multiplying means by said output signal.

10. The combination of claim 9 wherein said correcting signal is produced in response to overlapping of adjacent ones of said pulses.

11. In combination:
means for receiving multipath distorted phase shift keyed pulse signals;
means for deriving a reference signal having substantially the same envelope as the received signal pulses and a phase state independent of changes of phase state in said received signals;
means for detecting the phase state of said received signal pulses, said detecting means comprising means for comparing the phase state of said received signals with the phase state of said reference signal;
means for integrating the detected signal;
means for summing the integrated detected signal with a correction signal;
means for sampling the sum produced by said summing means;
means for producing an output signal in response to the sampled sum;
means for producing a signal representing the difference between said sum produced by said summing means and said output signal;
means for storing a signal representing the phase state of the immediately previously received pulse signal;
first multiplying means for multiplying said signal representing said difference by said signal stored in said storing means;
means for producing a signal representing the average of the output of said first multiplying means over at least a portion of a pulse period;
second multiplying means for multiplying said signal representing said average by said signal stored in said storing means, said correcting signal being produced as by the product produced by said second multiplying means.

12. The combination of claim 11 wherein said sampling means samples said sum produced by said summing means a plurality of times during a pulse processing time at predetermined intervals until said correcting signal is substantially zero.

13. The combination of claim 12 wherein said phase state of said received signals may be of two predetermined values.

14. The combination of claim 13 wherein said phase state of said received signals may be of four or more predetermined values.

15. In combination:
means for receiving multipath distorted phase shift keyed signals upon a plurality of channels;
means for deriving a reference signal for each of said channels having substantially the same complex envelope as the signals received in that channel;
means for comparing the received signals in each channel with the reference signal of that channel;
means for producing a detected signal in each of said channels as a result of said comparing means;
means for producing the integral of the output signal from said detecting means in each of said channels;
means for sampling the output of each of said integrating means in each of said channels;
means for producing an output signal in each of said channels representing the amplitude of the sampled signal in each of said channels; and
means for producing a correction signal in each of said channels in response to the output of each channel representing the amount of overlap between adjacent signals within that channel and between signals in that channel and other ones of said channel.

16. The combination of claim 15 wherein said correction signal producing means comprising in combination:
means for producing an error signal in each of said channels as the difference between said output signal and the sum of said output from said integrating means and said correction signal;
means in each of said channels for storing the value of said output signal from the pulse processed immediately previous to the pulse then being processed in that channel;
first multiplying means in each channel for multiplying said error signal by the stored values for each of said channels;
means for averaging the product of said error signal and said stored value for each product formed within each channel of said error signal within said channel;
means for multiplying the averaged signal within each channel by said stored value in each channel; and
means for forming the sum of the products in each of said channels of all of said products produced by said second multiplying means in each of said channels, said correction signal in each channel being produced as said sum of said products of said second multiplying means.

17. The method comprising the steps of:
producing a signal representing the integral of detected received signals, said received signals comprising a series of pulses, each of said pulses representing a discrete digital state;
producing an output signal representing the discrete digital states of said received signals;
producing an error signal representing the difference between said output signal and said signal representing said integral of detected received signals; and
producing a correcting signal in response to said error signal.

18. The method of claim 17 wherein the sum of said correcting signal and said signal representing said integral form the input of said output signal producing means.

19. The method of claim 18 wherein said step of producing said output signal comprises:
producing one or more samples of said signal representing said integral; and
storing the value of said samples over a predetermined period of time.

20. The method of claim 17 wherein said step of producing said correcting signal comprises:

storing the output signal from the previous pulses;

multiplying said error signal by the stored output signal;

averaging the product of said error signal and said stored output signal; and multiplying the averaged signal by said stored output signal.

21. The method of claim 20 wherein said correcting signal is produced in response to overlapping of adjacent ones of said pulses.

* * * * *

UNITED STATES PATENT OFFICE
CERTIFICATE OF CORRECTION

Patent No. 4,032,847          Dated June 28, 1977

Inventor(s)   Unkauf, Manfred G.

It is certified that error appears in the above-identified patent and that said Letters Patent are hereby corrected as shown below:

Column 1, line 4:  change "discribed" to -- described --;
Column 3, line 25: change "storage" to -- storing --; and
          line 43: change "four" to -- two --.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*